United States Patent
Mueller et al.

(10) Patent No.: US 11,732,863 B2
(45) Date of Patent: Aug. 22, 2023

(54) ILLUMINATION DEVICE FOR A MOTOR VEHICLE

(71) Applicant: Bayerische Motoren Werke Aktiengesellschaft, Munich (DE)

(72) Inventors: Michael Mueller, Munich (DE); Daniel Niebler, Munich (DE); Mohamed Rabeh, Munich (DE); Harald Schaffler, Neuhof (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/916,152

(22) PCT Filed: Mar. 24, 2021

(86) PCT No.: PCT/EP2021/057508
§ 371 (c)(1),
(2) Date: Sep. 30, 2022

(87) PCT Pub. No.: WO2021/197946
PCT Pub. Date: Oct. 7, 2021

(65) Prior Publication Data
US 2023/0134469 A1    May 4, 2023

(30) Foreign Application Priority Data
Apr. 2, 2020 (DE) .................. 10 2020 109 136.2

(51) Int. Cl.
*F21S 43/245* (2018.01)
*F21S 43/14* (2018.01)
(Continued)

(52) U.S. Cl.
CPC ............. *F21S 43/245* (2018.01); *B60Q 3/12* (2017.02); *B60Q 3/64* (2017.02); *F21S 43/14* (2018.01);
(Continued)

(58) Field of Classification Search
CPC ...... F21S 43/237; F21S 43/239; F21S 43/245; G02B 6/001; G02B 6/0068; G02B 6/0036; G02B 6/0038
See application file for complete search history.

(56) References Cited

U.S. PATENT DOCUMENTS

| 5,668,913 A | 9/1997 | Tai et al. |
| 2001/0049893 A1 | 12/2001 | Maas et al. |

(Continued)

FOREIGN PATENT DOCUMENTS

| DE | 35 42 292 A1 | 7/1986 |
| DE | 101 35 478 A1 | 4/2003 |

(Continued)

OTHER PUBLICATIONS

International Search Report (PCT/ISA/210) issued in PCT Application No. PCT/EP2021/057508 dated Jul. 1, 2021 with English translation (six (6) pages).

(Continued)

*Primary Examiner* — Eric T Eide
(74) *Attorney, Agent, or Firm* — Crowell & Moring LLP

(57) ABSTRACT

An illumination device for a motor vehicle includes at least one light source and an elongated waveguide which is delimited along the length thereof by a lateral surface. The waveguide is configured to guide light from the at least one light source along a light propagation direction in a totally reflective manner, the light propagation direction corresponding to the length of the waveguide. The light of the at least one light source can be coupled into the waveguide via a coupling surface at an end face of the waveguide, and a decoupling structure is provided in the lateral surface of the waveguide for decoupling light, which exits the waveguide (Continued)

via an exit region of the lateral surface along the light propagation direction, thereby overriding the total reflection condition.

16 Claims, 2 Drawing Sheets

(51) Int. Cl.
    *F21S 43/247*     (2018.01)
    *F21S 43/237*     (2018.01)
    *F21S 43/31*     (2018.01)
    *B60Q 3/12*     (2017.01)
    *B60Q 3/64*     (2017.01)
    *F21W 104/00*     (2018.01)
    *F21W 106/00*     (2018.01)

(52) U.S. Cl.
    CPC ........... *F21S 43/237* (2018.01); *F21S 43/247* (2018.01); *F21S 43/315* (2018.01); *B60Q 2400/50* (2013.01); *F21W 2104/00* (2018.01); *F21W 2106/00* (2018.01)

(56) References Cited

U.S. PATENT DOCUMENTS

| | | | |
|---|---|---|---|
| 2009/0185389 A1* | 7/2009 | Tessnow | G02B 6/0038 362/516 |
| 2014/0140084 A1 | 5/2014 | Zwick | |
| 2015/0098118 A1* | 4/2015 | Shiue | H04N 1/0288 358/475 |
| 2017/0106836 A1 | 4/2017 | Sobecki et al. | |
| 2018/0017226 A1* | 1/2018 | Valois | B60Q 1/00 |
| 2018/0086028 A1* | 3/2018 | Berard | B32B 17/10761 |
| 2018/0087748 A1 | 3/2018 | Gladden et al. | |
| 2018/0126899 A1 | 5/2018 | Bayersdorfer et al. | |
| 2019/0377126 A1* | 12/2019 | Itabashi | F21S 43/249 |
| 2022/0001195 A1* | 1/2022 | Lim | G02B 6/0081 |

FOREIGN PATENT DOCUMENTS

| | | |
|---|---|---|
| DE | 10 2005 046 538 A1 | 5/2007 |
| DE | 600 30 541 T2 | 8/2007 |
| DE | 10 2011 014 923 A1 | 9/2012 |
| DE | 10 2012 221 389 A1 | 5/2014 |
| DE | 11 2015 001 401 T5 | 2/2017 |
| DE | 10 2016 121 475 A1 | 5/2018 |
| DE | 10 2018 220 623 A1 | 6/2020 |
| EP | 2 980 469 A1 | 2/2016 |
| WO | WO 2013/060665 A1 | 5/2013 |

OTHER PUBLICATIONS

German-language Written Opinion (PCT/ISA/237) issued in PCT Application No. PCT/EP2021/057508 dated Jul. 1, 2021 (six (6) pages).

German-language Search Report issued in German Application No. 10 2020 109 136.2 dated Dec. 18, 2020 with partial English translation (12 pages).

* cited by examiner

ILLUMINATION DEVICE FOR A MOTOR VEHICLE

BACKGROUND AND SUMMARY OF THE INVENTION

The invention relates to an illumination device for a motor vehicle and to a corresponding motor vehicle.

It is known from the prior art to use light guides for total-reflection guiding of light both for interior illumination and as exterior light for a motor vehicle.

Document WO 2013/060665 A1 discloses an illumination device for a motor vehicle, having a light guide which is supplied by way of a laser light source. In order to extract the light from the light guide, an output structure is in this case provided along the lateral surface of the light guide.

In conventional motor vehicle illumination devices, light guides are used to produce full-surface light distributions. To date, there have been no approaches for generating other types of light distributions with a light guide.

It is an object of the invention to provide an illumination device for a motor vehicle, which produces a new type of light distribution by way of a light guide.

This object is achieved by the illumination device according to the claimed invention.

The illumination device according to an embodiment of the invention is intended for a motor vehicle, in particular for an automobile and optionally also for a truck. When interactions between the illumination device and the motor vehicle, or component parts of the motor vehicle, are described below, and particularly in the patent claims, this is always intended to mean that the interaction takes place when the illumination device is arranged or installed in the motor vehicle. The component parts of the illumination device which have a corresponding interaction with the motor vehicle, or components of the motor vehicle, are therefore configured in such a way that the interaction is brought about when the illumination device is arranged or installed in the motor vehicle.

The illumination device according to an embodiment of the invention comprises at least one light source and an elongate light guide, which is bounded along its longitudinal extent by a lateral surface. The light guide is adapted for total-reflection guiding of light of the at least one light source along a light propagation direction, which corresponds to the longitudinal extent of the light guide. The light of the at least one light source is introduced during operation of the illumination device through an input surface on an end side of the light guide. In this case, an output structure is provided in the lateral surface of the light guide for the extraction of (previously introduced) light, which emerges from the light guide along the light propagation direction through an exit region of the lateral surface by negating the total reflection condition.

In the illumination device according to an embodiment of the invention, the output structure in the elongate light guide is formed by a plurality of disjunct output regions, which are surrounded by a region of the lateral surface that is provided for total-reflection guiding of light. The illumination device is furthermore configured in such a way that a light graphic is generated on a surface arranged next to the light guide from extracted light of the disjunct output regions which emerges through the exit region of the lateral surface, each output region being assigned to a different element, which is formed from extracted light of the assigned output region, of the light graphic.

The light graphic therefore comprises a plurality of elements, each element originating from extracted light of an assigned output region. Preferably, the elements of the light graphic are disjunct in a similar way to the output regions, that is to say they do not overlap with one another. Preferably, the shape of a respective element of the light graphic corresponds to the shape of the assigned disjunct output region, although the dimensions of the respective elements need not be the same as the dimensions of the associated output regions.

The illumination device according to an embodiment of the invention has the advantage that an appealing light graphic can be produced in a straightforward way by way of a light guide by disjunct output regions.

In one embodiment, the surface arranged next to the light guide, on which the light graphic is formed, is a part of the illumination device which also becomes a part of the motor vehicle when the illumination device is installed in a corresponding motor vehicle. It is likewise possible for the surface arranged next to the light guide to be a component part of the motor vehicle which does not belong to the illumination device. Furthermore, the surface may also not be a constituent part of the motor vehicle, and it may for example be a region of the ground in the vicinity of the motor vehicle.

In one simple configuration of the illumination device according to the invention, no further components are provided between the exit region on the lateral surface of the light guide and the surface on which the light graphic is reproduced. Preferably, however, a lens array which consists of a plurality of lenses, and by which extracted light of at least some of the disjunct output regions is projected onto the surface arranged next to the light guide and is preferably imaged sharply there, is arranged next to the exit region of the lateral surface. Preferably, in this case each disjunct output region whose light is projected through the lens array onto the surface arranged next to the light guide is assigned to a separate lens of the lens array, by which only extracted light of the assigned output region is projected onto the surface arranged next to the light guide, and is preferably imaged sharply there. With this embodiment, suitable adaptation of the light graphic to the location and the shape of the surface on which the light graphic is represented may be achieved. In one preferred variant, the lens array is a lens disk, preferably in the form of an injection-molded plastic component.

In another preferred configuration, a mask consisting of translucent and opaque regions, through which extracted light of at least some of the disjunct output regions impinges on the surface arranged next to the light guide, is arranged next to the exit region of the lateral surface. In this way, a particularly high-contrast reproduction of the light graphic may be achieved. In one variant, corresponding lenses of the lens array described above are in this case arranged in at least some of the translucent regions.

In one preferred configuration of the embodiment described above, each disjunct output region whose light impinges through the mask on the surface arranged next to the light guide is assigned to a separate translucent region of the mask, through which only extracted light of the assigned output region impinges on the surface arranged next to the light guide.

The lens array or the mask of the embodiments described above may be configured differently. In one variant, the lens array and/or the mask is respectively a one-piece component.

In another configuration of the illumination device according to the invention, the disjunct output regions respectively comprise a printed surface and/or a roughened surface and/or a prism arrangement consisting of one or more prisms. With such structures, the extraction of light from the light guide may be ensured in a straightforward way.

In another variant of the illumination device according to the invention, the disjunct output regions are configured in such a way that the light graphic has a substantially constant luminance over its surface. This may be achieved by the output regions extracting a commensurately greater proportion of the light impinging on them when they are further away from the input surface.

In another embodiment, at least some of the disjunct output regions respectively have the shape of a strip, the strip preferably being a straight strip, which preferably extends perpendicularly to the light propagation direction in the light guide. Corresponding strips are preferably also generated as disjunct elements in the light graphic.

In another configuration, at least some of the disjunct output regions respectively have the shape of a circle. As an alternative or in addition, at least some of the disjunct output regions may also respectively have the shape of an ellipse. Preferably, corresponding circles or ellipses are also found in the light graphic generated. Optionally, it is also possible for the shape of the output regions to describe a symbol which is also encountered in the light graphic generated. The symbol has a semantic meaning content for an observer and may, for example, contain one or more logos or text components.

In another expedient variant, the output regions are formed in a plane surface section of the lateral surface of the light guide, the plane surface section extending along the light propagation direction. In this way, the creation of corresponding output regions in the light guide is simplified.

In another preferred variant, the at least one light source comprises one or more LEDs and/or one or more laser diodes. In this way, a compact structure of the illumination device may be achieved.

In another preferred embodiment, the at least one light source is an RGB lamp unit having a red illuminant, a green illuminant and a blue illuminant, the light of which can be introduced through the input surface of the light guide. This embodiment is preferably combined with the variant described above, i.e. the corresponding illuminants are LEDs and/or laser diodes. Preferably, the brightness of the respective illuminant of the RGB lamp unit is adjustable so that different colors may be generated by way of the illumination device according to an embodiment of the invention.

In a preferred variant of the embodiment just described, no output structure is formed in a predetermined section of the light guide which follows on from the input surface in the light propagation direction, so that the predetermined section carries out mixing of the light of the red, green and blue illuminants.

In one particularly preferred configuration, the illumination device according to the invention is an interior lamp for the passenger compartment of the motor vehicle, for example an ambient interior lamp. The interior lamp may in this case be fitted at any desired locations in the interior. Preferably, the interior lamp is adapted to produce the light graphic on a surface of a dashboard or on a surface of an inner door panel or on a surface of a back panel of a passenger seat. Preferably, the illumination device is in this case also fitted in the dashboard or on the inner door panel or on the back panel of the passenger seat, respectively.

In another variant, the illumination device is an exterior lamp for the exterior of the motor vehicle, the exterior lamp preferably being adapted to produce the light graphic on a ground surface in the vicinity of the motor vehicle.

Besides the illumination device described above, the invention also comprises a motor vehicle which contains one or more of the illumination devices according to an embodiment of the invention or one or more preferred variants of this illumination device.

An exemplary embodiment of the invention will be described in detail below with the aid of the appended figures.

DETAILED DESCRIPTION OF THE DRAWINGS

Figure 1:
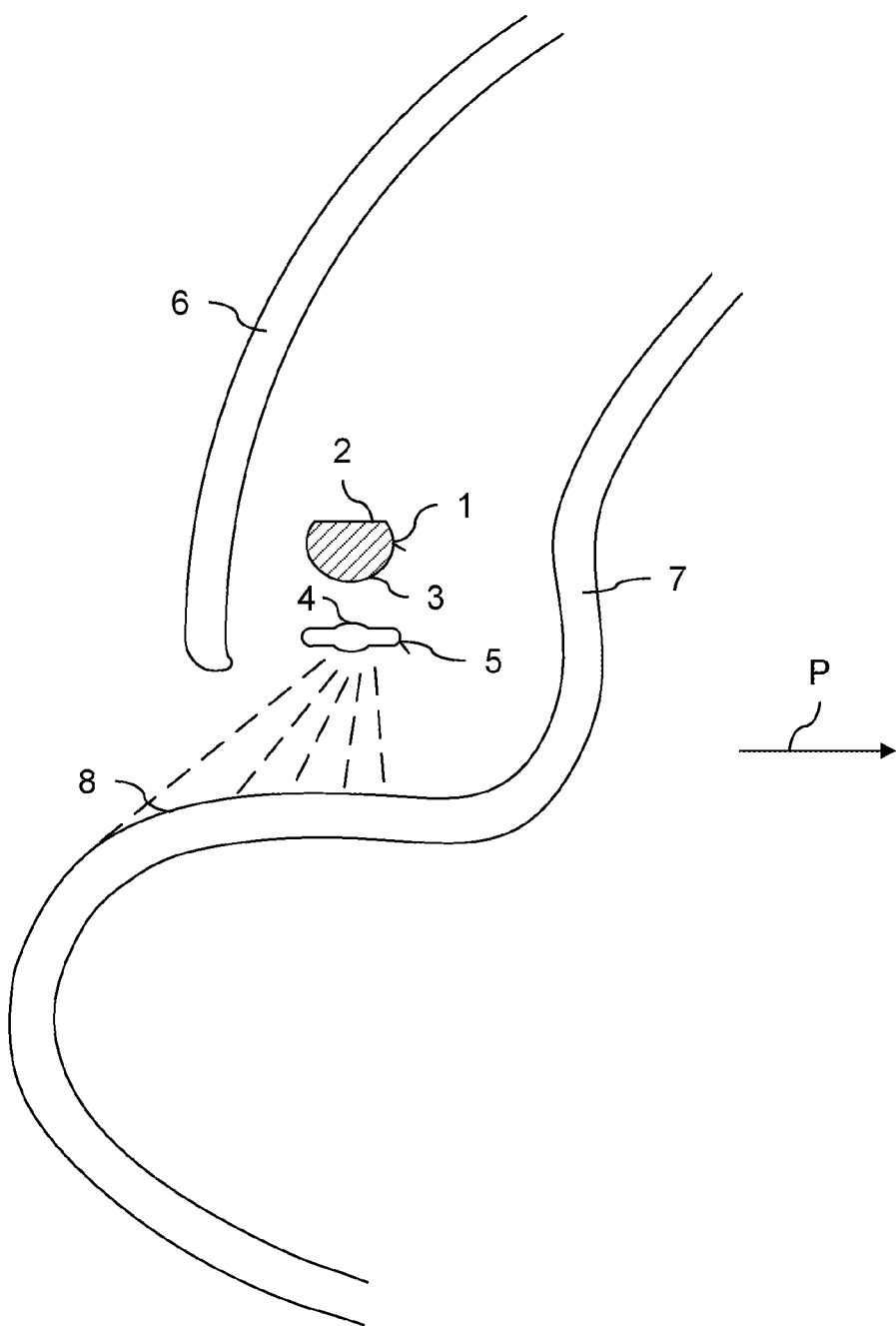
FIG. 1 shows a schematic cross-sectional view of an embodiment of an illumination device according to the invention, which is fitted in the dashboard of a motor vehicle.

An embodiment of an illumination device according to the invention, which is fitted in the dashboard of a motor vehicle, will be described below. As may be seen from the sectional view of FIG. 1, the illumination device is arranged between an upper plastic part 6 and a lower plastic part 7, which are constituent parts of the dashboard. The represented section in this case extends in a vertical plane which is perpendicular to the transverse direction of the motor vehicle. In the representation of FIG. 1, the front passenger (not shown) is on the left next to the plastic parts 6 and 7. The longitudinal direction of the motor vehicle is indicated by the arrow P, which points in the forward direction of the motor vehicle.

The plastic part 7 has a curved shape, so that a surface 8 which is illuminated by the illumination device described below is formed. This illumination is indicated by dashed lines in FIG. 1. The illumination device comprises an elongate light guide 1 as well as a lens array 5 consisting of a plurality of lenses 4, which are arranged next to one another in the longitudinal direction of the light guide, as may be seen from FIG. 2 which is described below.

The lens array is a one-piece component, for example a transparent injection-molded component. The light guide and the lens array consist of materials which are known per se, for example PMMA (PMMA=polymethyl methacrylate). The light guide 1 and the lens array 5 are fastened on the plastic part 6 by a suitable fastener. For reasons of clarity, this fastener is not reproduced in the schematic representation of FIG. 1.

The light guide 1 has a round cross section, which is flattened on the upper side. In other words, the lateral surface of the light guide consists of a plane upper surface region 2 and a subsequent round surface region 3. The light guide has the shape of a rod, as may be seen from the perspective view of FIG. 2. For illustration, the forward direction of the motor vehicle is again indicated by the arrow P in FIG. 2. As may likewise be seen in FIG. 2, a lamp module 10 which shines light into an input surface on the end side of the light guide is arranged at the left end of the rod-shaped light guide 1. In the embodiment described here, the lamp module 10 is an RGB LED module having a red, green and blue LED, the brightnesses of which can be adjusted separately as a function of the desired light color. In this way, it is possible to generate light with a different color in the light guide.

In a conventional light guide, provided in the plane surface region 2 there is a continuous output structure which, in contrast to the round surface region 3, is not used for total-reflection light guiding but causes light scattering so that light from the output structure emerges directly from the light guide through a lower section of the round surface region 3. The output structure may, for example, be provided by forming prisms or a sawtooth structure in the plane surface region 2 or by roughening or printing on this surface region.

In contrast to a conventional output structure, the output structure of the embodiment described here consists of a plurality of disjunct output regions 9. In other words, there are a plurality of nonoverlapping output regions, which are in turn surrounded by surface regions of the light guide that are intended for total-reflection guiding of light in the light guide. According to FIG. 2, the disjunct output regions 9 have the shape of strips which extend transversely with respect to the longitudinal direction of the light guide 1 and are separated uniformly from one another. As in the case of a conventional output structure, the individual disjunct output regions bring about light extraction, which may again be achieved by introducing prisms or a sawtooth structure, or by a roughened surface or printing on the surface.

Figure 2:
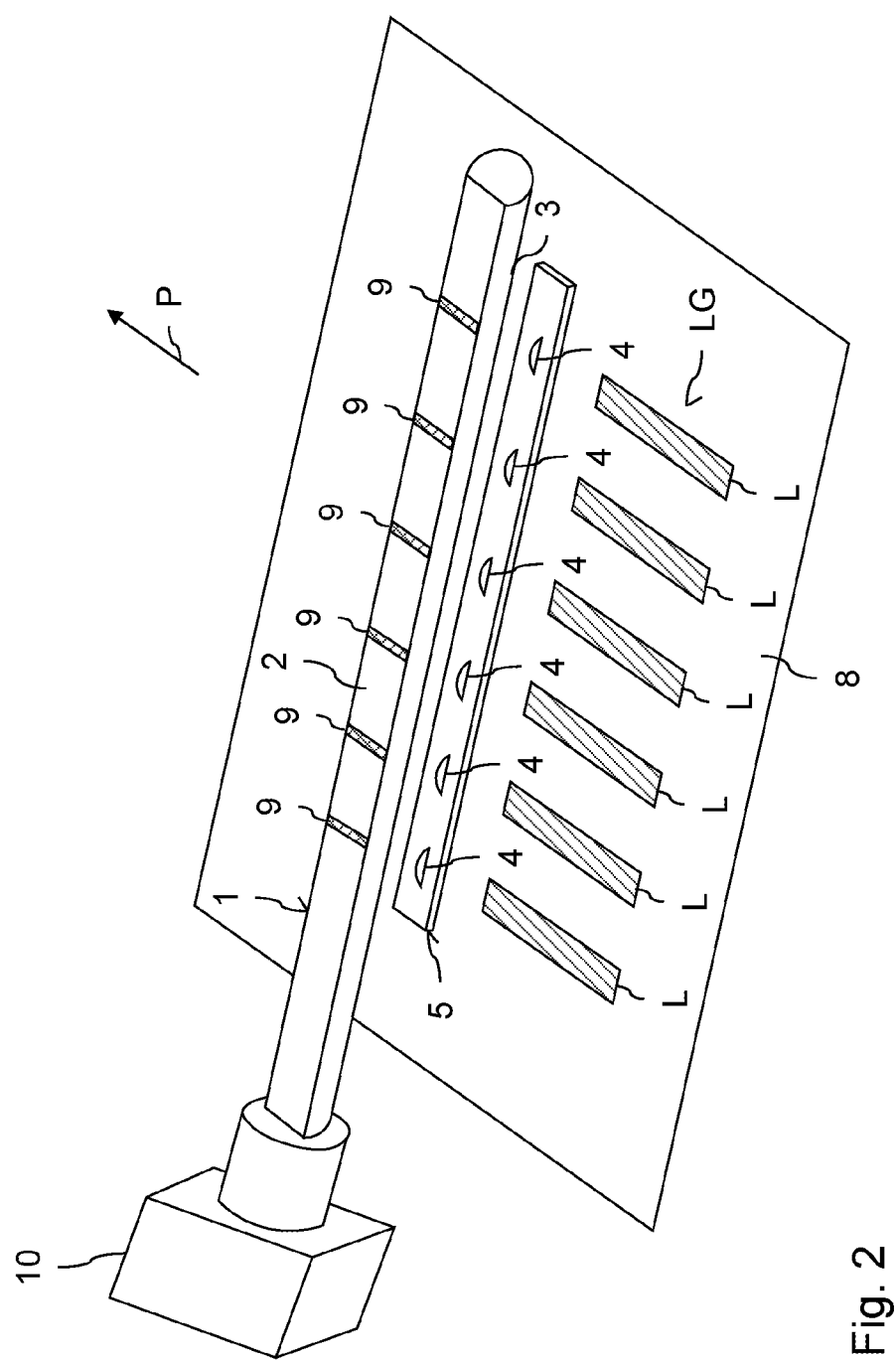
FIG. 2 shows a schematic perspective view of the illumination device of FIG. 1.

According to FIG. 2, the output regions 9 do not begin immediately next to the input surface of the light guide, but instead a section without output regions is initially provided in the light guide. The effect achieved by this is that the light of the red, green and blue LEDs of the lamp module 10 is suitably mixed and a mixed color is therefore extracted through the disjunct output regions. Each individual output region 9 is assigned a lens 4 of the lens array 5. The respectively assigned lens lies above the corresponding output region in the vertical direction, as may be seen from FIG. 2. Only the light of the output region lying above, which emerges from the light guide 1 through a lower section of the round surface region 3, impinges on each lens 4.

By the individual lenses 4, a sharp projection of the light of the respective output regions onto the surface 8 of the plastic part 7 is brought about, so that a light graphic LG consisting of elements in the form of bright light strips L is formed on the surface 8 from the light of the output regions. In other words, the output regions 9 are imaged sharply onto the surface 8 with the aid of the lenses 4 so that the light strips L, the shape of which is defined by the shape of the output regions 9, are formed. In this way, very appealing ambient interior light is generated for the passengers of the motor vehicle in the form of parallel light strips on the dashboard.

The formation of disjunct output regions as strips extending transversely with respect to the light guide is merely exemplary. The output regions may also have other shapes, and the shapes of the individual output regions may also be different to one another. For example, the output regions may also be formed as circles and/or ellipses or as oblique and/or curved strips. What is crucial is merely that each output region 9 is projected separately by an assigned lens 4 of the lens array 5 onto the surface 8 in the dashboard. Optionally, the output regions may also be configured in such a way that a symbol, for example a logo or text, is generated as a light graphic by way of the disjunct output regions.

In a modified embodiment, a mask which only ever has a translucent region vertically below a corresponding output region, and is otherwise opaque, may also be provided instead of a lens array. In this way as well, corresponding light strips may be produced on the surface 8, although they are not sharply imaged on the surface 8. Nevertheless, the mask allows a high contrast of the light strips represented. In another modified embodiment, a further component between the light guide 1 and the surface 8 is entirely omitted. In other words, the extracted light of the individual disjunct output regions impinges directly on the surface 8 after emerging from the light guide. In this case as well, a light graphic consisting of a plurality of light strips is formed. In contrast to the previous embodiments, however, this light graphic is more blurred and has lower contrast.

The invention has been explained with the aid of an embodiment of an illumination device which is integrated in the dashboard of a motor vehicle and generates ambient light there. Nevertheless, the illumination device may also be installed at other locations in the passenger compartment. For example, the illumination device may be provided in the inner door panel or in the back panel of driver's or front passenger's seat, where it generates a light graphic on a corresponding surface of the inner door panel or back panel of the seat.

The embodiments described above have a number of advantages. In particular, an appealing light graphic can be generated in a straightforward way by use of a light guide, by the light of disjunct output regions being projected onto a corresponding surface. The illumination device may in this case be provided at different positions in the interior of the vehicle. Furthermore, the illumination device may optionally also be used as exterior light in a motor vehicle, i.e. the light guide emits into the exterior region of the body of the motor vehicle. Preferably, the extracted light in this case shines onto the ground in the vicinity of the motor vehicle in order to generate a corresponding light graphic there.

LIST OF REFERENCES 1 light guide
2 plane surface region
3 round surface region
4 lens
5 lens array
6 upper plastic part
7 lower plastic part
8 surface of the lower plastic part
9 output regions
10 lamp module
L light strip
LG light graphic
P forward direction of the motor vehicle

What is claimed is:

1. An illumination device for a motor vehicle, the illumination device comprising:
at least one light source; and
an elongate light guide, wherein:
the light guide is bounded along a longitudinal extent by a lateral surface,
the light guide is adapted for total-reflection guiding of light of the at least one light source along a light propagation direction, which corresponds to the longitudinal extent of the light guide,
the light of the at least one light source is introducible through an input surface on an end side of the light guide, an output structure is provided in the lateral surface of the light guide for extraction of light, which emerges from the light guide along the light propagation direction, through an exit region of the lateral surface by negating a total reflection condition, the output structure is formed by a plurality of disjunct output regions, which are surrounded by a region of the lateral surface that is provided for total-reflection guiding of light, the illumination device is configured such that a light graphic is generated on a surface arranged next to the light guide from extracted light of the disjunct output regions, each output region is assigned to a different element of the light graphic which is formed from extracted light of the assigned output region, and:

at least some of the disjunct output regions respectively have a shape of a strip, wherein the strip is a straight strip which extends perpendicularly to the light propagation direction in the light guide, and/or at least some of the disjunct output regions respectively have a shape of a circle, and/or at least some of the disjunct output regions respectively have a shape of an ellipse.

2. The illumination device according to claim 1, wherein a shape of a respective element of the light graphic corresponds to a shape of the assigned output region.

3. The illumination device according to claim 1, wherein a lens array, which consists of a plurality of lenses and by which extracted light of at least some of the disjunct output regions is projected onto the surface arranged next to the light guide, is arranged next to the exit region of the lateral surface.

4. The illumination device according to claim 3, wherein each disjunct output region whose light is projected through the lens array onto the surface arranged next to the light guide is assigned to a separate lens of the lens array, by which only extracted light of the assigned output region is projected onto the surface arranged next to the light guide.

5. The illumination device according to claim 1, wherein a mask consisting of translucent and opaque regions, through which extracted light of at least some of the disjunct output regions impinges on the surface arranged next to the light guide, is arranged next to the exit region of the lateral surface.

6. The illumination device according to claim 5, wherein each disjunct output region whose light impinges through the mask on the surface arranged next to the light guide is assigned to a separate translucent region of the mask, through which only extracted light of the assigned output region impinges on the surface arranged next to the light guide.

7. The illumination device according to claim 3, wherein the lens array is a one-piece component.

8. The illumination device according to claim 5, wherein the mask is a one-piece component.

9. The illumination device according to claim 1, wherein the disjunct output regions respectively comprise at least one of a printed surface, a roughened surface, or a prism arrangement consisting of one or more prisms.

10. The illumination device according to claim 1, wherein the disjunct output regions are configured such that the light graphic has a substantially constant luminance over a surface of the light graphic.

11. The illumination device according to claim 1, wherein the output regions are formed in a plane surface section of the lateral surface of the light guide, the plane surface section extending along the light propagation direction.

12. The illumination device according to claim 1, wherein the at least one light source comprises one or more LEDs and/or one or more laser diodes.

13. The illumination device according to claim 1, wherein:

the at least one light source is an RGB lamp unit having a red illuminant, a green illuminant and a blue illuminant, the light of which is introducible through the input surface of the light guide, and no output structure is formed in a predetermined section of the light guide which follows on from the input surface in the light propagation direction, so that the predetermined section carries out mixing of the light of the red, green and blue illuminants.

14. The illumination device according to claim 1, wherein:

the illumination device is an interior lamp for a passenger compartment of the motor vehicle, and the interior lamp is configured to produce the light graphic on a surface of a dashboard, or on a surface of an inner door panel, or on a surface of a back panel of a passenger seat.

15. The illumination device according to claim 1, wherein:

the illumination device is an exterior lamp for an exterior of the motor vehicle, and the exterior lamp is adapted to produce the light graphic on a ground surface in a vicinity of the motor vehicle.

16. A motor vehicle comprising the illumination device according to claim 1.

* * * * *